(12) United States Patent
Edwards

(10) Patent No.: US 8,125,718 B2
(45) Date of Patent: *Feb. 28, 2012

(54) TELESCOPES FOR SIMULTANEOUS CLEAR VIEWING OF OBJECTS AND AREAS BOTH NEAR AND DISTANT

(75) Inventor: D. Brandon Edwards, Virginia Beach, VA (US)

(73) Assignee: Edwards Optical Corporation, Virginia Beach, VA (US)

( * ) Notice: Subject to any disclaimer, the term of this patent is extended or adjusted under 35 U.S.C. 154(b) by 272 days.

This patent is subject to a terminal disclaimer.

(21) Appl. No.: 12/378,490

(22) Filed: Feb. 13, 2009

(65) Prior Publication Data

US 2009/0213473 A1    Aug. 27, 2009

Related U.S. Application Data

(63) Continuation-in-part of application No. 11/329,360, filed on Jan. 9, 2006, now Pat. No. 7,511,896, which is a continuation-in-part of application No. 11/199,583, filed on Aug. 8, 2005, now abandoned.

(60) Provisional application No. 60/599,926, filed on Aug. 9, 2004.

(51) Int. Cl.
G02B 13/00    (2006.01)

(52) U.S. Cl. .................. 359/744; 359/784; 359/399

(58) Field of Classification Search .................. 359/399, 359/421, 428, 744, 784
See application file for complete search history.

(56) References Cited

U.S. PATENT DOCUMENTS

| | | | |
|---|---|---|---|
| 2,474,837 A * | 7/1949 | Glancy | .......................... 359/769 |
| 4,540,238 A | 9/1985 | Edwards | |
| 4,832,465 A | 5/1989 | Arai et al. | |
| 4,877,316 A | 10/1989 | Edwards et al. | |
| 5,004,332 A | 4/1991 | Edwards | |
| 5,052,790 A | 10/1991 | Edwards et al. | |
| 5,121,251 A | 6/1992 | Edwards | |
| 5,189,560 A | 2/1993 | Edwards et al. | |

* cited by examiner

*Primary Examiner* — Mark Consilvio
(74) *Attorney, Agent, or Firm* — Hamilton, Brook, Smith & Reynolds, P.C.

(57) ABSTRACT

A telescope that provides for simultaneous clear viewing of objects or areas at various distances may be either Galilean or astronomical. The telescope may be mounted on or into any mechanism or device used for targeting or aiming. Such devices may include iron sights of small arms weapons, and cameras and telescopes, which may be either electrically or manually focused. These miniature scopes are engineered to maximize the clear depth-of-field viewing by the eye regardless of vision irregularities, such as Presbyopia, Myopia, Hyperopic, Astigmatism, or combinations of these, in conjunction with or without spectacle lens corrections. This aiming scope/device may be placed on a pair of spectacles in a very close proximity to the eye cornea. Other maximized scope image characteristics that occur are field-of-view, luminosity, and unmagnified and unbroken or distorted viewing field. Clearly detailed simultaneous viewing of images of all objects or areas at almost all distances forward of the objective lens is readily apparent to the scope user. Such objects include sighting devices forward of the scope on guns, bows, cameras, telescopes, and any target seen within the scope. Most reticles used in conjunction with this invention will also be observed in the scope.

25 Claims, 10 Drawing Sheets

Galilean

Astronomical

Galilean

Astronomical

Galilean
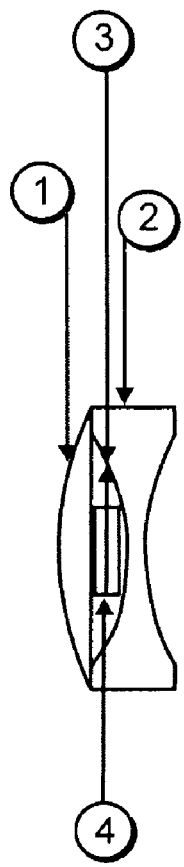
Astronomical
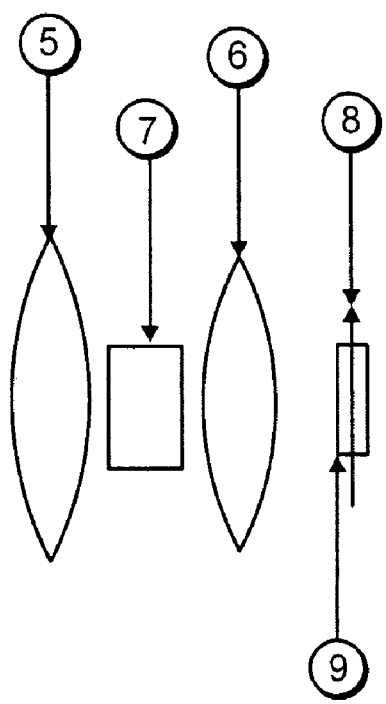
FIG. 5
FIG. 6

TELESCOPES FOR SIMULTANEOUS CLEAR VIEWING OF OBJECTS AND AREAS BOTH NEAR AND DISTANT

RELATED APPLICATIONS

This application is a continuation-in-part of U.S. application Ser. No. 11/329,360, filed Jan. 9, 2006 now U.S. Pat. No. 7,511,896, which is a continuation-in-part of U.S. application Ser. No. 11/199,583, filed Aug. 8, 2005 now abandoned, which claims the benefit of U.S. Provisional Application No. 60/599,926, filed on Aug. 9, 2004. The entire teachings of the above applications are incorporated herein by reference.

BACKGROUND OF INVENTION

Great-depth-of-field (G.D.F.) telescopes as described in U.S. Pat. No. 5,189,560 have proven to be useful. Although they do function satisfactorily, there are inherent limitations experienced by certain individuals when using these miniature scopes. These limitations include lowered luminosity levels, relatively small fields-of-view, and restricted eye crystalline lens accommodation capabilities. Eye lens non-accommodation can be medically termed presbyopia. Presbyopia is very common especially in the middle-aged and older citizenry. This condition results from the eye lens no longer being able to observe a clear great-depth-of-field when relaxed.

In addition, conditions resulting from eyeball shape irregularities such as myopia, hyperoptic and astigmatism in combination with presbyopia further limit a user's ability to visually realize the great-depth-of-field offered by these scopes. Scope users with more perfect visual capabilities do not experience such limitations. The most perfect visual capability is medically termed emmotropic. Here, the eye displays neither nearsightedness (myopia), farsightedness (hyperopic), astigmatism, nor eye lens accommodation difficulties (presbyopia).

The principal hindrance experienced by many G.D.F. scope users is that of not being able to perceive visually the entire depth-of-field that the U.S. Pat. No. 5,189,560 scopes offer. The clear ocular end of the scope field-depth zone is seen while the far or objective end of the field-depth zone offered by these scopes is unclear to some degree.

For other individual scope users the reverse might be true. Corrective spectacle or contact lenses might help to improve, to some small degree, these eye dysfunctions when using these Edward's et. al. G.D.F. scopes. (U.S. Pat. No. 5,189,560)

SUMMARY OF THE INVENTION

Three basic factors that restrict the ability of the users of (G.D.F.) miniature scopes described in U.S. Pat. No. 5,189,560 are addressed in this disclosure. These factors include: lowered luminosity levels, relatively small field-of-view, and restrictive eye lens accommodation. Medically, accommodation applies to the eye lens' ability to clearly bring to focus images of objects at varying distances onto the retina of the eye. Restricted accommodation may be amplified by irregularities in the shape of the eyeball (too long or too short) and a non-spherical surface on the cornea. By significantly altering the design specifications of G.D.F. scopes first cited in U.S. Pat. No. 5,189,560, the light levels, fields-of-view, and eye lens accommodation are significantly increased. Vision being assisted with the present G.D.F. accommodation now overrides pre-existing eye maladies that inhibited the user's viewing of a great-depth-of-field zone.

Typically, this invention embodies an ultra-low power scope constructed with lenses of much longer focal length than those used in U.S. Pat. No. 5,189,560. Long focal length lenses used to make low powered scopes allow for close positioning of the objective and ocular lens elements, particularly in the Galilean systems. By having the Galilean lenses touch each other, the luminosity level, field-of-view, and eye lens accommodation ability are extensively maximized. For astronomical units of ultra-low power, lenses cannot touch each other, because the rectification prisms must remain between the two convexo-convex lenses. However, the basic G.D.F. effect is still realized to a great degree. For any observer of the scope exit pupil images, with or without a spectacle or contact lens correction, the G.D.F. is observable in its entirety. The observer's spectacle corrections can be put either into the G.D.F. lenses or in line with the G.D.F. scope. The present invention is engineered to be mountable not only on the targeting devices such as small arms as in U.S. Pat. No. 5,189,560, but also onto spectacle, framed, lenses as in U.S. Pat. No. 4,540,238, both patents being incorporated by reference herein in their entireties.

It is known from U.S. Pat. No. 4,540,238 that miniature telescopes ranging from approximately 5.13 millimeters to 12.7 millimeters of outside diameters require very short focal length lenses. Short focal length lenses are used to produce the standard powers ranging from 2.0× to 8.0×. These focal lengths also define a small, scope, internal diameter and a significant distance between the scope lens elements. These lenses allow for very short scope lengths and small diameters. As a result, miniature telescope elements described before this invention have very steeply curved surfaces. It is well known that these steeply curved surfaces distort both spherically and chromatically in the periphery of the exit-pupil image planes. For this reason, the exit pupil plane diameters must be kept relatively small so as to eliminate these peripheral distortions. Decreasing the diameter of these miniature scope exit-pupil planes automatically decreases the light levels and fields-of-view produced by these scopes.

The long focal length lens elements described here are lenses that make these G.D.F. units very low in power, making possible the use of very long radii of curvature for the lenses used in the present invention. Extremely flat radii automatically result in peripheral absence of spherical and chromatic aberration. Hence, the greater can be the diameter of the clearly focused exit pupil planes. With the increased diameter of the exit pupil plane, both luminosity levels and fields-of-view are automatically increased. With the proper long focal length lenses creating an ultra-low powered telescope, the light level is the same in the scope as with the unaided eye without this G.D.F. unit. Also, the eye field-of-view through the G.D.F. scope is the same as the normal field-of-view without the G.D.F. unit.

The third factor cited previously that restricts the use of scopes described in U.S. Pat. No. 5,189,560 concerns the eye crystalline lens. Medically the restriction is known as presbyopia, which again, is common throughout much of the world's population. Presbyopia requires the use of bifocal or trifocal spectacle or contact lenses to correct for near vision tasking such as reading or even middle range viewing. Presbyopia, often in combination with myopia, hyperopic, and or astigmatism, limits the eye's ability to bring to focus a clear image of objects at varying distances from the scope onto the retina without these spectacle or contact lens corrections. The present invention may employ long focal length lenses in an ultra-low-power scope design. The Galilean type scope lenses that touch each other produce a G.D.F. unit that corrects for most presbyopic conditions. In some instances, spectacle corrections for distance viewing may be necessary to observe the G.D.F. in its entirety. The scopes described in U.S. Pat. No. 5,189,560 do not allow the presbyopic scope user to see clearly and simultaneously all objects being targeted at varying distances forward of G.D.F. unit, even with spectacle correction. Specifically, the near objects are not in focus while the distant objects are in focus, or vise versa.

A telescope with a great depth-of-field may be obtained by arranging the scope components to obtain a short exit pupil plane zone. The exit pupil plane zone may be less than 1 mm in length or even less than 0.01 mm. That short exit pupil plane zone is obtained by positioning lens components, such as the positive and negative lens components of a Galilean telescope, immediately adjacent to each other or even touching at their peripheries and/or centers (FIG. 14). To that end, it is preferred that the telescope have a power of less than 1.1, or even about 1, and that each lens component have a focal length of at least 70 mm, preferably greater than 1,000 mm.

BRIEF DESCRIPTION OF THE DRAWINGS

The foregoing and other objects, features and advantages of this invention will be apparent from the following, more particular, description of preferred embodiments of the invention. As illustrated in the accompanying drawings, like reference characters refer to the same parts throughout the different views. The drawings are not necessarily to scale, emphasis instead being placed upon illustrating the principles of the invention.

FIG. 5 depicts a Galilean telescope with objective and ocular lens elements numbered 1 and 2 touching at their peripheries, or slightly separated with a compressed EPPZ number 4 and example EPP at number 3. This scope represents an embodiment of the present invention.

FIG. 6 is an illustration of an astronomical telescope system, which for the present invention, has been foreshortened. The lens elements are numbers 5 and 6. The rectification prism is number 7 and the exit pupil plane representation is number 8. The compressed EPPZ is number 9.

DETAILED DESCRIPTION OF THE INVENTION

Figure 1:
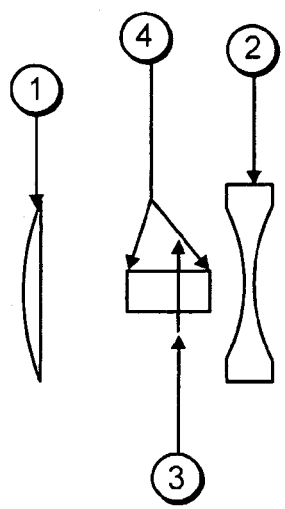
FIG. 1 is an illustration of a telescope (2× to 8×) of Galilean design denoted in U.S. Pat. No. 4,540,238. The lenses numbered 1 and 2 are the basic elements of the scope and the number 3 represents an exit pupil plane (EPP) for an object forward of the scope. This exit pupil plane is one of an infinite number of planes located in the exit pupil plane zone (EPPZ) for a two to eight power Galilean system. This EPPZ is numbered 4.
Figure 2:
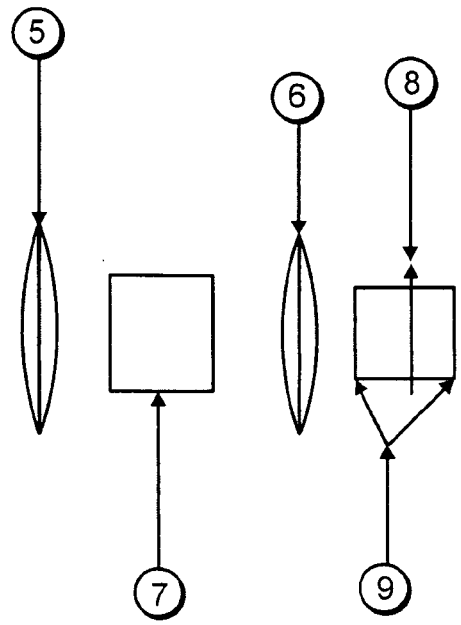
FIG. 2 is an illustration of an astronomical telescope depicted in U.S. Pat. No. 4,540,238. The lenses numbered 5 and 6 are the basic elements of this system. The number 7 represents a prism used for image inversion. This arrangement consists of either a single element known as a Lemon-Springer Prism, or a combination of two standard triangular prisms. Here also is the EPP denoted as number 8 with an example EPPZ at number 9.

A description of preferred embodiments of this invention follows.

Definitions

Accommodation is the eye's ability to bring into focus on the retina objects at varying distances from the eye. The reshaping of the eye's crystalline lens is governed by tiny ligaments and muscles which control accommodation.

Emmotropia occurs when the crystalline lens of the eye is completely relaxed, and the eye system, including the actual length of the eye globe, are such that images of distant objects are brought to a clear focus on the retina of the eye simultaneously.

Ametropia is the condition that prevents clear focusing of the distant objects on the retina. Inappropriate eye globe lengths, hardening or inflexibility of the crystalline lens, or non-spherical shaping of the cornea are known causes.

Myopia is commonly known as short sightedness and occurs when light from a distant object is brought to focus not on, but in front of the retina.

Hypreopia is commonly known as farsightedness and occurs when light from a distant object is brought to focus behind the retina creating image distortion.

Presbyopia is the condition in which accommodation is restricted. Here the eye lens muscles or ligaments are no longer functioning properly or the crystalline lens itself becomes hardened and can no longer change shape to bring to focus all objects in the viewing field.

Astigmatism is a condition, usually associated with the cornea, which results in general image distortion. An imperfect spherical shape on the front or rear curves of the cornea causes this.

Equations:

$f1-f2=\Delta$ —for a Galilean scope  1

$f1+f2=\Delta$ —for astronomical scopes  2.

$f1/f2=sx$ (nominal for distant object)  3.

$rc=(n-1)f1$ for plus lenses  4.

$rc=2(n-1)f2$ for negative lenses  5.

$\lambda=f1-f2/sx$ or $=\Delta/sx$  6.

Where:
f1=focal length of the objective lens
f2=focal length of the ocular lens
Δ=dblc=distance between lens centers
sx=scope power
n=refractive index of 1 for air
rc=radius of curvature
λ=apparent location of the exit pupil plane, as noted by the eye, between scope lenses and measured from the center of the negative lens.

Symbols Defined:
EP=exit pupil
EPP=exit pupil plane
EPPZ=exit pupil plane zone
G.D.F.=great depth of field Knowns:
1. The objective lens of a telescope (an afocal system) is a convergent lens.
2. The ocular lens of a telescope is a magnifier lens of either a convexo-convex positive lens or a negative lens, which may have several lens curve shapes.
3. For a Galilean telescope, the negative ocular produces a virtual exact image at infinity.
4. For a Galilean system, the apparent location of the scope image emanates from a plane at a specific distance forward of the ocular. This location is termed the exit pupil, Ramsden Circle, or eye ring.
5. For a Galilean system, the location of the principal exit pupil plane forward of the ocular for distant objects is constant for any given ocular focal length.
6. In order to achieve a clearly imaged EPP for the Galilean scopes for any object forward of the scopes:
  a. The negative lens must be adjusted to be either closer to or farther from the objective lens.
  b. At this adjustment distance, the rays coming from the EPP are parallel to each other.
  c. For a Galilean system, these parallel rays govern the field of view of the system.
7. For Galilean scopes, the adjustment of the distance between the objective and ocular lens produces clear EPP's for objects forward of the scopes. Here an infinite number of EPP's representing most distances is located between the two telescope lens elements.
8. The depth of field displayed by any telescope is a result of the eye's inability to see blur circles on EPP's immediately adjacent to the principle EPP as defined by the ocular lens.
9. The entrance pupil for a Galilean telescope is an aperture (or stop), which limits the internal diameter of the system and is usually placed very near the objective.
10. For a Galilean or astronomical telescope, the actual location of the exit pupil plane is at and governed by the eye lens.
11. A means of increasing the power of a Galilean telescope is by adding dioptic power to the scope by means of an add on plus lens forward of the scope.
12. A means of increasing the power of a Galilean telescope can be accomplished by moving the negative or ocular lens away from the objective lens.

From the above, it becomes apparent that, through the adjustment process of the ocular lens element to produce clear EPP's for most objects forward of the objective lens, a cylindrically shaped volume is defined between the two lens elements. This cylinder is defined as the exit pupil plane zone (EPPZ) for any given Galilean scope of any given power. There are an infinite number of exit pupil image planes (all parallel to each other) in this exit pupil plane zone.

The present discoveries are rooted in equations 1, 2 and 6 above. When values for the focal lengths are made to be very long and, hence, the curve radii become proportionately flatter, the scope powers can much more easily be made lower.

For U.S. Pat. No. 5,189,560 the great-depth-of-field was easily attained using U.S. Pat. No. 4,540,238 technology, both of which are incorporated herein by reference. Here, relatively short focal length lenses, along with low powers, small scope internal diameters, and long eye relief distances combined to produce generally satisfactory images for normally sighted individuals with or without spectacle corrections.

The ranges of focal lengths, diameters, and powers for these two patents are from 2 mm to 32 mm, 3 mm to 19 mm, and 2× to 8× respectfully.

Normally sighted individuals denoted in this instance include those with emotropic, myopic, or hyperopic vision.

The principal scope elements addressed for major modification in the present invention are lens focal lengths, distances between lens centers, and long curvature radii.

Figure 3:
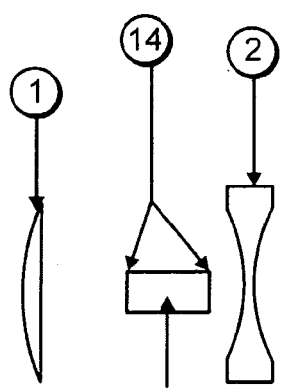
FIG. 3 is an illustration that depicts the principle of a Galilean scope system and the EPPZ number 14 displayed for these lenses. This figure also illustrates the EPPZ described in scopes for U.S. Pat. No. 5,189,560 that are low power (less than 2×). This FIG. 3 (along with FIG. 4 below) is included here to illustrate that the scopes for U.S. Pat. Nos. 4,540,238 and 5,189,560 are designed using relatively short focal length lenses. Hence, the location, shape, and size of the EPPZ for FIGS. 1 and 3 and FIGS. 2 and 4 respectively are the same in nature.
Figure 4:
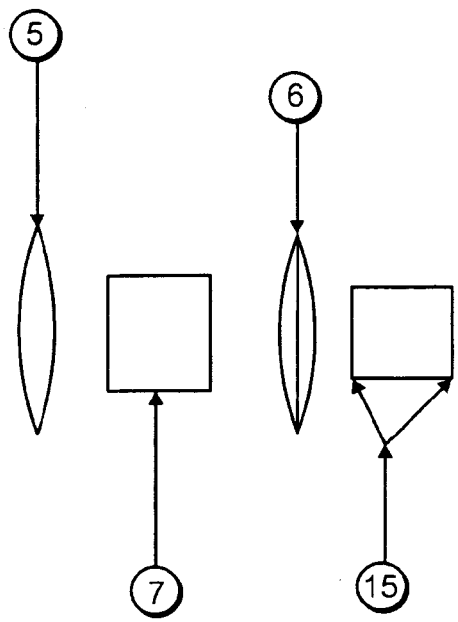
FIG. 4 is an illustration for a low power astronomical telescope with lens elements numbered 5 and 6, prism inversion element number 7, and EPPZ number 15 described in scopes for U.S. Pat. No. 5,189,560.

FIGS. 3 and 4 depict the type of miniatures used to create the sighting Telescopes for Simultaneous Viewing of Target and Sight U.S. Pat. No. 5,189,560. Here, these low-powered scope images for objects at varying distances from the scope objective lens are defined in areas or zones, numbered 14 and 15 respectively for these two types of scopes. In this zone, all of the images formed by the ocular lenses, numbered 2 and 6 are brought to focus. These ocular images are also designated as exit pupil planes for objects at various distances forward of the scope. The two zones numbered 14 and 15, contain an infinite number of exit pupil planes corresponding to the infinite number of object distances forward of the objective lens.

The location of all possible Galilean scope virtual images appear (to the eye) to come from a cylinder shaped zone between the scopes lenses. The individual image plane within the zone for each object distance forward of the scope objective are called the exit pupil planes, Ramsden circle, or eye ring (Finchem, Fry). The apparent location of this exit pupil plane forward of and measured from the ocular lens center can be calculated by the equation:

$$\lambda = f1 - f2/sx$$

Where:

the scope power sx varies as the lenses are moved relative to each other to focus, and $\lambda$=a distance forward of and measured from the ocular lens center Variations of this equation can be produced. The use of this equation helps define mathematically the exit pupil plane zones (EPPZs) for ultra low powered telescopes for those of less than 2×. Such ultra-low powered scopes approaching or less than 1×, constructed with lens focal lengths and curvature radii from 1 mm to almost infinity, and having internal diameters of less than 1 mm to more than 100 mm's for both ocular and objective lenses which can be made to touch each other at their peripheries, or slightly separated so as to have a like effect, are not known to have been parameterized with these dimensions before the present invention.

Vision irregularities such as myopia, hyperopia, and presbyopia for certain scope users, restrict the full use of the entire length of the EPPZ for low power scopes such as those described in U.S. Pat. No. 5,189,560. As a result, many users of those scopes do not experience a great-depth-of-field (G.D.F.) now produced in the present invention. Scope users experiencing unaccommodated emmotropic vision see the great-depth-of-field with little difficulty for U.S. Pat. No. 5,189,560 as well as present invention scopes.

For simplicity of reference, a Galilean scope system is described in the FIGS. 5, 8, 9, 10, 11 and 14. These are the preferred design embodiments. Astronomical systems can be made to produce a G.D.F. effect, though not to the same extent as Galilean systems.

The concept of a defined region or zone of a cylinder shape between the lenses of a Galilean scope system where all of the virtual image exit pupil planes can be mathematically defined for all object distances forward of the scope objective is new.

A difference in prior scope systems and the present embodiments occurs when different longer focal length lenses are made to touch or nearly touch each other at their peripheries and/or centers as shown in FIGS. 5, 8, 9, and 14. The lengths of the EPPZs for devices of U.S. Pat. No. 5,189,560, (FIG. 3, 14 and FIG. 4, 15) and the present invention (FIG. 5, 4 and FIG. 6, 9) are radically different for these two types of low powered miniature telescope's systems.

The forward to rearward length of the EPPZ's as illustrated in U.S. Pat. No. 5,189,560 (FIGS. 3 and 4) and the present (FIGS. 5 and 6) are very different in length. The EPPZ lengths, front to back, can be made to approach zero in the present scopes using lenses of approximately the same, absolute-value focal lengths. These lens combinations of nearly the same plus and minus focal lengths, and for which are taken to be (for miniature scale) ultra-long lengths, produce unanticipated imagery planes. For such a compressed EPPZ almost all image planes appear to merge to become one two dimensional EPP.

FIGS. 3 and 4 EPPZs 14 and 15 for U.S. Pat. No. 5,189,560, respectively, are long enough to create depth-of-field usage difficulties for certain scope users with vision irregularities as previously described. The present invention illustrated in FIGS. 5 and 6, at 4 and 9, respectively, create EPPZs narrow, or thin enough, front to back, to allow for nearly universal (all user) eye lens accommodation. Because the EPPs are so closely adjacent to each other, blur circles in these adjacent EPPs go unnoticed through out the EPPZ. Hence, almost all EPPs appear sharply clear. In the case of some extremes in vision irregularities an in-line spectacle correction normally needed by the scope user may be necessary. If the user wishes to employ the present G.D.F. unit very near to the eye, a mounting, such as a double-sided sticky ring, could be attached to a framed spectacle lens.

Hence, for the majority of "normal" eye irregularities such as myopia, hyperopia, presbyopia, etc., a G.D.F. can be realized instantly in the present invention. These vision irregularities do not now negatively affect the experiencing of the great-depth-of-field effect offered by the concept first set forth in U.S. Pat. No. 5,189,560, and now realized by almost all scope users with the present invention.

Figure 7:
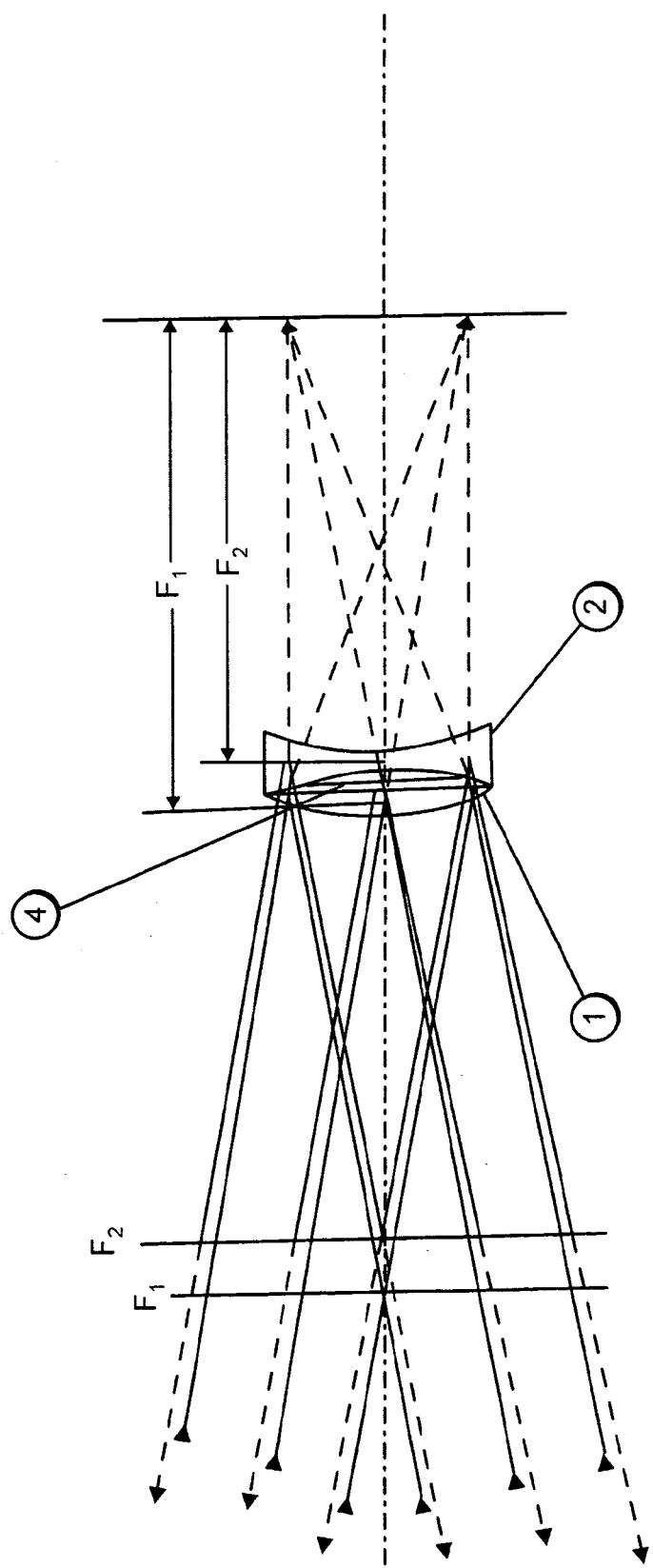
FIG. 7 depicts a ray diagram of the preferred Galilean embodiment of this invention that can be compared to FIG. 3 of U.S. Pat. No. 5,189,560. An exit pupil plane for lenses 1 and 2 that are touching each other at their peripheries, or slightly separated, is in the short EPPZ 4. Although the lenses focal lengths are such that the peripheries of the lenses touch, the apparent location of the exit pupil plane and the compressed exit pupil plane zone at 4 remain between the lenses as illustrated in the previous six figures.
Figure 8:
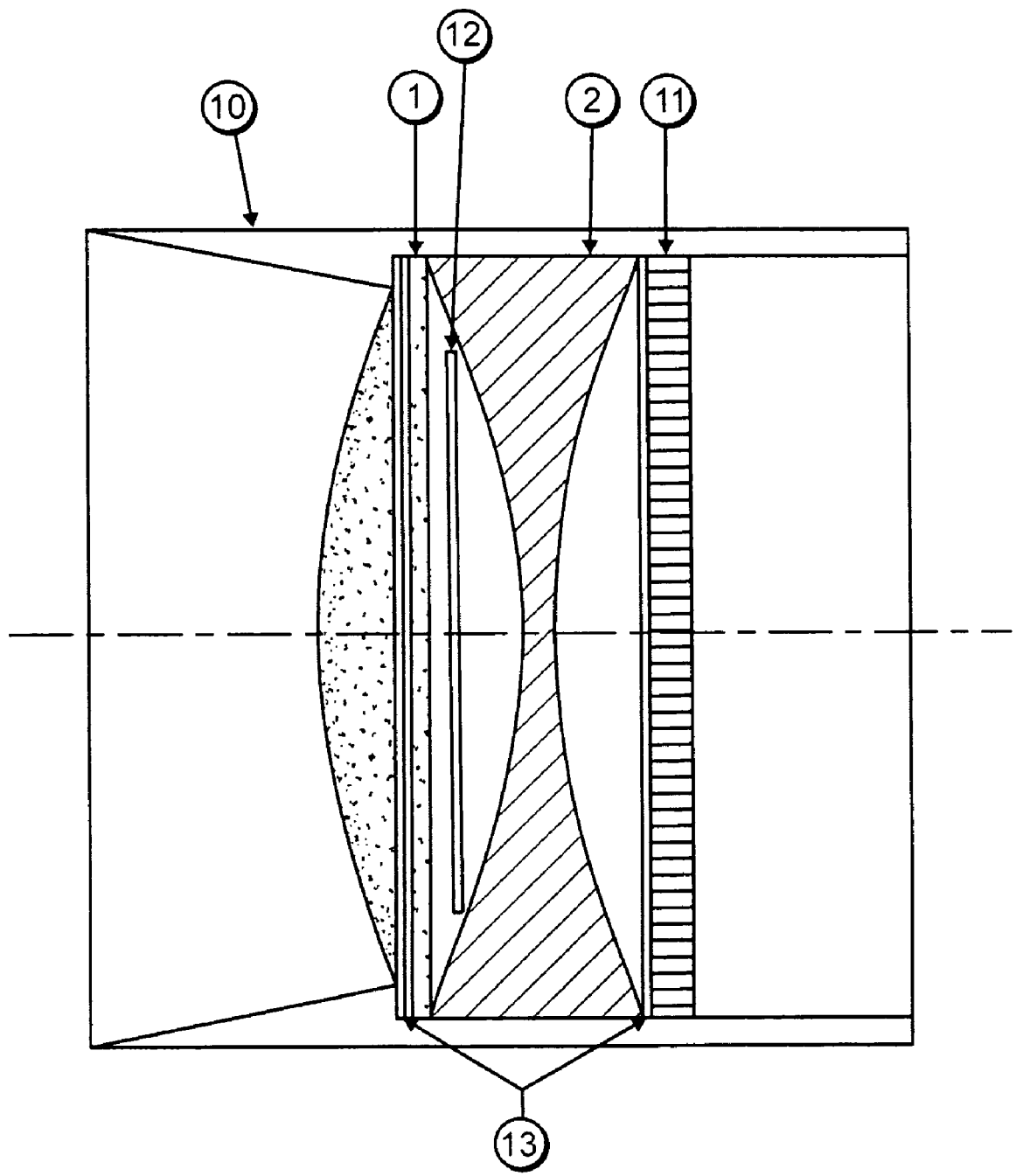
FIG. 8 is an illustration of one of the embodiments of this invention. The two lenses of the Galilean system, which are physically touching at their peripheries, or slightly separated, are numbered 1 and 2. The number 10 denotes the scope housing. The number 11 indicates a clear disc pressure fitted to seal the system. The number 12 is the approximate location of the EPPZ for this compressed EPP system. The number 13 denotes neoprene-like washer seals that protect the internal atmosphere of the system.

The significance attached to the use of long focal length and curvature radii lenses which touch or do not touch each other in the design of a very low power telescope used to shorten the EPPZ is great. FIG. 7 is a ray diagram for a Galilean scope system of very low power. Exemplified here, is an exit pupil plane located in an exit-pupil-plane-zone 4 actually thinner than the width of the drafted line of this illustration. In essence, the EPPZ cylindrical shape length, ocular to objective, for the lenses of this FIG. 7 is too small to be noted. Bringing the lenses close enough to each other so as to physically touch each other, or be slightly separated, at their peripheries minimizes along the central optical axis of the scope, the length of the EPPZ. A very short EPPZ 4 and 9 as denoted in FIG. 5 and FIG. 6, respectively, can eliminate depth-of-field limitations experienced by those scope users with eye conditions such as myopia, hyperopia, presbyopia, and astigmatisms, or a combination thereof. Some scope users with crystalline lens accommodation problems may need spectacle lens corrections to be able to observe the G.D.F. in its entirety. However, limitations exhibited by scopes of U.S. Pat. No. 5,189,560 are no longer an issue.

All telescopes display some degree of field depth regardless of power (Finchem, page 344). Often, this depth is also referred to as the depth of focus. This depth is determined by the diameter of the blur circles described in Finchem, page 343, and denoted in U.S. Pat. No. 5,189,560. It is also known that the lower the power of the scope, the greater the observed field depth. As described in U.S. Pat. No. 5,189,560, the clarity of field depth occurs as a result of both low-power and eye-relief. With low power and appropriate eye vertex distance from any of the EPPs of the scope, the blur circle diameters denoted in U.S. Pat. No. 5,189,560 and (Finchem) are too small to allow notice by the observer. These blur circle diameters are extremely small and are usually calculated as $\frac{1}{1000}$ of the focal length of the ocular lens for Galilean scopes (Finchem). Hence, all of the EPPs located in the EPPZs described in FIG. 3, 14 and FIG. 4, 15 are seen clearly by observers with normal, emmotropic, or myopic, hyperopic, and presbyopic corrected vision.

Scope image observers who possess vision irregularities such as presbyopia particularly in combination with myopia or hyperopia, by medical definitions cannot accommodate and observe all portions of the EPPZ as described in FIGS. 3 and 4, numbers 14 and 15, respectively (U.S. Pat. No. 5,189, 560). For those EPPZs of FIGS. 5 and 6, numbers 4 and 9 respectively, for the present invention, a great-depth-of-field can now be observed by all scope users regardless of vision irregularities, with or without spectacle corrections, as denoted above. Those scope users who are vision encumbered observe clearly only approximately 50% to 70% of the EPPZ at any one instant for U.S. Pat. No. 5,189,560 illustrated in FIGS. 3 and 4. By foreshortening or compressing the EPPZ from its lengths in FIGS. 3 and 4, numbers 14 and 15 respectively to those of FIGS. 5 and 6, numbers 4 and 9, respectively, a great-depth-field can now be observed by all scope users regardless of conditions of vision irregularities as denoted above. Here, in FIGS. 5 and 6 the length or thickness of the EPPZ cylinder is small to the extreme. Essentially, the infinite numbers of EPPs, which are designated randomly in FIG. 5 at 3 and FIG. 6 at 8, appear in this ultra-compressed EPPZ simultaneously. This zone spans a length or volume that can be readily accommodated by the presbyopia corrected or uncorrected eye depending on severity.

It is known that long focal length lenses are associated with flatter lens surface curves. In the present invention, which exhibits objective and ocular lenses in very close proximity to each other, the entrance and exit pupil diameters are the same as the diameters of these long focal length lenses. Hence, both the light gathering capacity and the field-of-view are at their maximum as seen by all scope users.

The range of parameters for the present invention is much greater than those in which the U.S. Pat. No. 5,189,560 are bound. It is known that small internal-diameter tubes, with or without lenses can be used to produce images, which possess a great-depth-of-field. These small I.D. tubercular devices greatly limit field-of-view, brightness and target acquisition capabilities; which is also well known.

U.S. Pat. No. 5,189,560 technology limited the focal lengths of the lenses used to fabricate these scopes. Here, short focal length lenses dictate smaller internal-diameter scopes. Low powered scopes together with long eye relief image characteristics, although limiting, are satisfactory for users with emotropic and somewhat less vision. With the expansion of the ranges for brightness, degrees of field, low powers and depth-of-field, much larger ranges of vision capabilities can now be accommodated.

The present invention expands all parameters for low power great-depth-of-field scopes. The employment of lens combinations involving focal lengths beyond those used in U.S. Pat. No. 5,189,560 facilitates increases by many fold scope image characteristics previously discussed. Specifically, in the present invention the G.D.F. powers range from −0.95× to 3× averaging 1.03×, as compared to an average of 1.3× for U.S. Pat. No. 5,189,560 systems. Scope outer diameters move from less than 25 mm to less than 100 mm. Exit pupil diameters move from less than 6 mm to less than 100 mm. Similarly, scope internal diameters increase from less than 6 mm to less than 100 mm. Degrees of viewing field approach 150 degrees from less than 10 degrees for U.S. Pat. No. 5,189,560. Eye relief in the present invention can now exceed 500 cm, whereas, previously it was considered to be less than approximately 66 cms.

Longer focal length lenses producing flatter curve radii make possible much larger overall diameter scopes, thereby enhancing scope parameter characteristics. Bringing the lens centers close enough to have the lenses touch at their peripheries, and/or centers (FIG. 14), or slightly separated, maximally compresses, from front to back, the exit pupil plane zone described in FIGS. 1-6 of the present drawing.

Essentially, the longer the focal lengths of the lenses used in the G.D.F. combination, the flatter the lens curves can be made. Physically flatter or flattest lenses can be formulated for having lens centers maximally close to each other. In other words, having f1−f2 approach 0 as much as physically possible maximally thins the EPPZ from front to back and hence make possible the low power Gallilean scope having great depth of field. Keeping the ultra-thinness of the EPPZ, that is thinness possibly approaching zero, and considering the Galilean scopes are adjusted for best focus for the individual, defines the universal adjustment capability of the present invention's G.D.F. scopes.

It is known that positioning of the ocular lens relative to the objective lens of a conventional Galilean scope is necessary for each individual scope user to achieve clear imagery. For any given eye accommodation characteristic, there is a particular EPP within the EPPZ to afford the user the best and clearest images. It is also known that any powered scope's clear depth-of-field results from unseen blur circles on the EPPs immediately adjacent to the best or closest EPP for that individual user. FIGS. 1-4 illustrate this concept using U.S. Pat. No. 4,540,238 and U.S. Pat. No. 5,189,560 miniature technology. FIGS. 5 and 6 illustrate the present invention with enhanced technology and the resulting increase in scope image parameters.

Maximizing focal lengths, and the length of the resulting lens curve radii, now dictate lens centers which are located close to each other. As lenses curves become flatter, lenses centers can be brought closer to each other using: f1−f2=0. This final result of having the lenses centers coincident with each other is physically impossible. However, as lens curve radii grow longer and lenses centers become closer, the EPPZs drawn in FIGS. 5 and 6 are ever more compressed, front to back.

And, the EPPs adjacent to the prime EPP for any individual scope adjustor merge with the prime EPP. Merging EPPs consolidates all image planes for all objects at almost all distances forward of the objective lens of this present G.D.F. scope system. The result is an apparent single clear scope image for most all objects forward of the scope and can be acquired by almost all scope users, regardless of normal eye imperfections from emmotropia to average presbyopia with or without in-line spectacle corrections attached to or built into the G.D.F. unit.

The formula:

$$\lambda = \Delta/sx \text{ where,}$$

Sx=scope power
Δ=f1−f2 and,
λ=distance of principle exit pupil of scope from the center and forward of the ocular lens makes possible the ultra thin definition of the thickness of the exit pupil plane zone for very low powered scopes.

For the emotropic eye, the great-depth-of-field of the present invention appears to create one exit pupil plane for all object images displaced from the scope from approximately 25 cm or even less, to infinity. Essentially, the forward most and rear exit pupil plane zone is only two dimensional, speaking practically.

For non-emotropic eye viewers, that is, observers who need spectacle corrections for myopia, hyperopia, and presbyopia, it may be necessary to move the exit pupil plane zone closer to or further from the objective lens. This translocation of the apparently two dimensional exit pupil plane zone moves the great-depth-of-field nearest clearly viewable boundary to a position approximately 25 cm from the objective lens or less. This 25 cm (10 inch) boundary usually allows for the employment of a two element target sighting array used for shot gun and rifle collimation. A barrel end post and nearer "V" element alignment promotes more accuracy when firing such small arms.

The repositioning of the exit pupil plane zone for prescription users can easily be accomplished by changing the dioptic power of either the objective or the ocular lens. The power of the scope may increase or decrease slightly. However, these power changes are insignificant and not noticeable by the observer.

In this way, a standardized location for the great-depth-of-field of from less than 25 cm ahead of the scope objective to infinity can be maintained for all scope observers.

Astigmatic vision prescriptions may easily be incorporated into either of the lenses of the present invention.

Repositioning the great-depth-of-field EPP in relation to the scope objective lens for non-emmotropic observers necessitates the changing of the focal length of either the objective or ocular lens of the scope. To accomplish this repositioning, mathematically, alterations in the formula: $\lambda = \Delta/sx$ can be made. For example; when the f1 and f2 focal lengths for a standardized great-depth-of-field of the present invention scope are established for lens elements which touch their peripheries, the "$\Delta$" parameter will be a permanently established constant. Hence, when f1 or f2 (sx=f1/f2) have to be chosen to relocate the exit pupil plane between the lenses, the great-depth-of-field EPP will also be repositioned closer to or further from the scope objective lens. These f1 and f2 changes will be made to better accommodate, for ease of use, certain eye prescription correction which exist for these scope observers.

It has also been determined that the use of extremely long focal length lenses of very low dioptic powers will make possible a very short vertex distance (distance between the rear of the scope and the eye cornea). The present invention may now operate satisfactorily mounted to the rear or front surface of a spectacle framed lens.

Addressing the thickness dimension for the EPPZ of the present invention is important. For the most distant objects imaged by the Galilean type telescope, the front plane location of the EPPZ can be calculated using the equation:

$\Delta/sx = \lambda$ where, $\Delta = f1 - f2$, sx=scope power and, $\lambda$=the location of the EPP from the center of the ocular lens in the direction of the objective lens.

For objects located closer to the telescope, the negative lens is moved or adjusted away from the plus lens of the system. The location of the EPP for the objects at distances closer to the scope is found by the same equations:

$\Delta/sx = \lambda$ where;

$\Delta = f1 - f2$ sx=scope power $\lambda$=the apparent location of the EPP away from the ocular scope lens It is known that clearly focusing the image for a near object of a Galilean scope can be accomplished by moving the ocular away from the objective which automatically increases the scope's power. (Angular magnification description Fincham p. 92, and Fry p. 45-126). The EPP for a very near object is located toward the rear of the EPPZ. Or, as a result of the rearward movement of the EPP during focusing (adjusting the position of the negative lens away from the plus lens) the succeeding scope image formations are located at an increasing distance away from the forward EPP (of the EPPZ) for the most distant object seen with any power Galilean scope.

When, in the present invention, the scope power is very low and the focal lengths of the two lenses are extremely long; all of the image planes for all but the extremely close objects just forward of the scope are seen or appear to be located on the same EPP as that of the most distant objects images. This results in clearly seen images of both very far and very near objects simultaneously clear. There is no need to move the negative lens for focusing relative to nearer objects.

Essentially this means that the EPPZ has no thickness for the scopes of this present invention and the EPPZ is a two dimensional plane located by the equation:

$\Delta/sx = \lambda$, where $\Delta = f1 - f2$ sx=scope power and $\lambda$=EPP location measured from the center of the negative or ocular lens, toward the objective lens.

The thickness or third dimension for the EPPZ for the present invention does not exist as the eye perceives it.

Because the exit pupil plane zone for a very low power, long focal length set of scope lens produces an EPPZ that appears to the observer to consist of only one image plane (EPP); modifying the equation $f1 - f2 = \Delta$ by changing f1 slightly has the effect of physically moving the EPP closer to or farther from the negative lens. This shift of the EPP toward or away from the eye enhances the eye lens' ability to focus scope images on the retina with or without the aid of what is commonly known as bifocals, trifocals or progressive special lens aids. By increasing f1, the EPP appears to move toward the objective lens. By decreasing the value of f1, the EPP appears to move away from the objective lens. With these changes in f1, the two lenses of the present invention remain in contact with each other at their peripheries. By similarly changing the f2 ocular focal length the EPP will also move toward or away from the objective lens.

Essentially, the EPP (or compressed EPPZ) shift moves the boundaries, both front and rear, for the G.D.F. EPPZ seen for this low power scopes' images. Both boundaries for the G.D.F. EPPZ appearing on the compressed EPPZ or apparent two-dimensional EPP move toward the eye. The need for the eye lens to adjust for clear focusing of scope images for objects ranging from distant to very near the scope objective is no longer necessary.

G.D.F. scope parameters for the embodiment of the present invention are now contrasted with parameters for scopes for U.S. Pat. No. 5,189,560. These parameters below are:

| Parameter (lengths in mm) | Prior sighting scope | Preferred ranges | Example (approximate) |
| --- | --- | --- | --- |
| Powers(x) | 1.3x to 3x | Less than 1.1x | 1.0003 |
| Outside Diam. | 6 to 12 | 6-19 mm | 13 |
| Exit Pupil Diam | <8 | 4-16 | 10 |
| EPPZ Thickness | 2 to 6 | less than 1 mm, preferably less than .01 | .001 |
| Degrees of Field | 4° to 10° | 2° to 150° | 30° |
| Internal Diam | <8 | 4-16 | 1.0 |
| Eye Relief, eye to scope | 250 to 660 | 4 to 1,000 | 13, on spectacles |
| Focal lengths | 10 to 25 | greater than 70, preferably greater than 1000 but less than 30,000 | 4,000 |
| Radii of curvature | 8 to 12 | greater than 35, preferably greater than 500 but less than 30,000 | 2,000 |

-continued

| Parameter (lengths in mm) | Prior sighting scope | Preferred ranges | Example (approximate) |
|---|---|---|---|
| Lens dioptic power | 8 to 12 | less than 6, preferably less than 0.12 | 0.06 |
| Overall length | 8-12 | 2.5-4 | |

In summary, long focal length and radii lenses can be made to produce ultra-flat, ultra-thin lens combinations particularly at very low powers. It is known that theoretically/mathematically the thinnest and flattest curved lenses can be made to produce the brightest, clearest and widest diameter images, and hence, the widest field-of-view images.

Image characteristics such as those just described are maximized for scopes of lowest powers and lens combinations formulated for contact at their peripheries and/or centers. Here again, exit pupil image rays are parallel and appear to emanate from one, two-dimensional EPP between the lenses.

Figure 9:
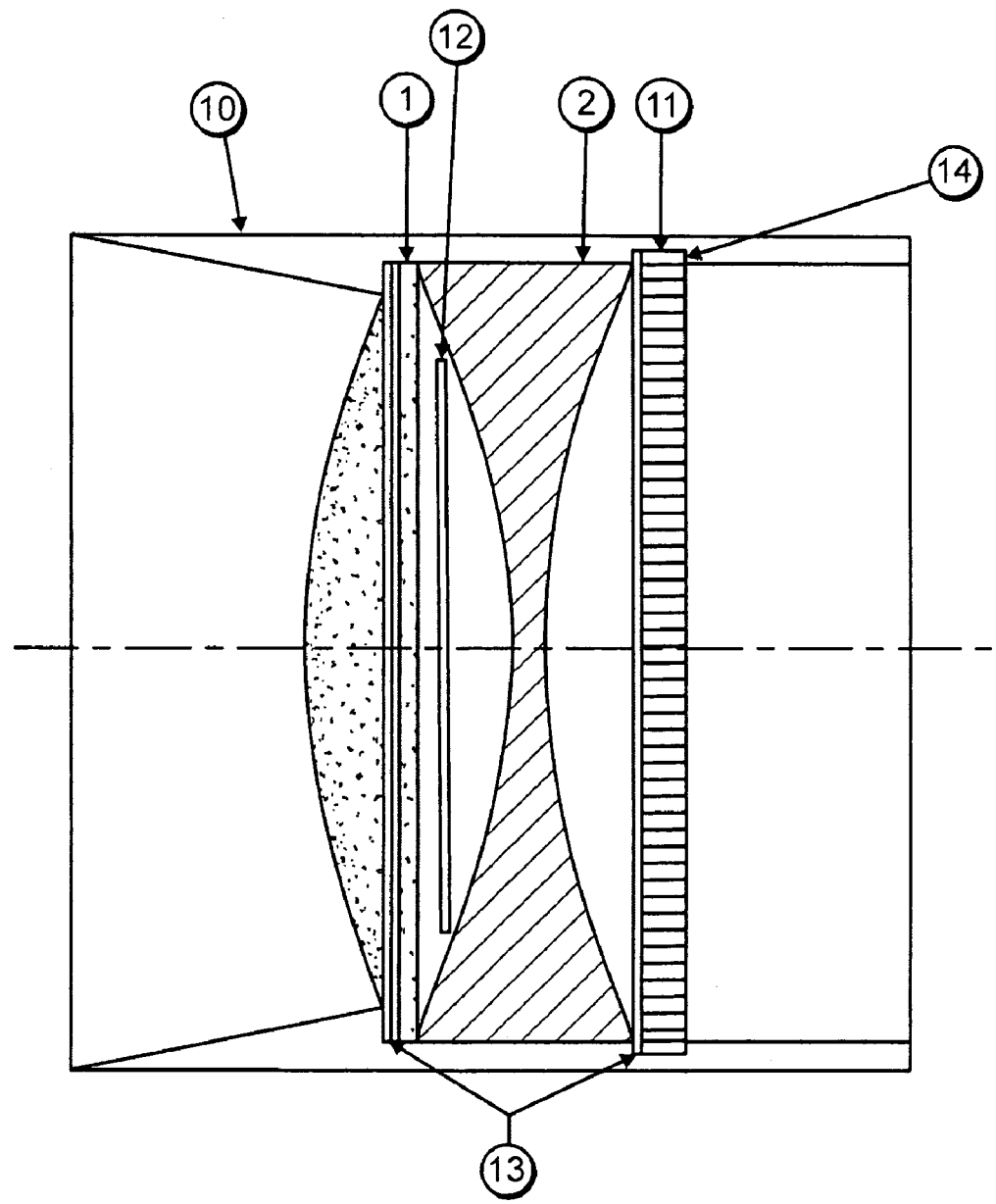
FIG. 9 is an illustration of another embodiment of this invention. The two lenses of this Galilean system are objective lens number 1 and ocular lens number 2 which touch each other at their peripheries. The number 10 denotes the scope housing. Number 11 indicates a clear disc, which is snap fitted into a peripheral slot. Number 12 locates the approximate position of the EPPZ for this compressed EPP system. The number 13 signifies neoprene-like seals that protect the internal atmosphere of the system. The number 14 illustrates the slot groove within the housing in which the disc number 11 and rear neoprene-like seal fit.
Figure 10:
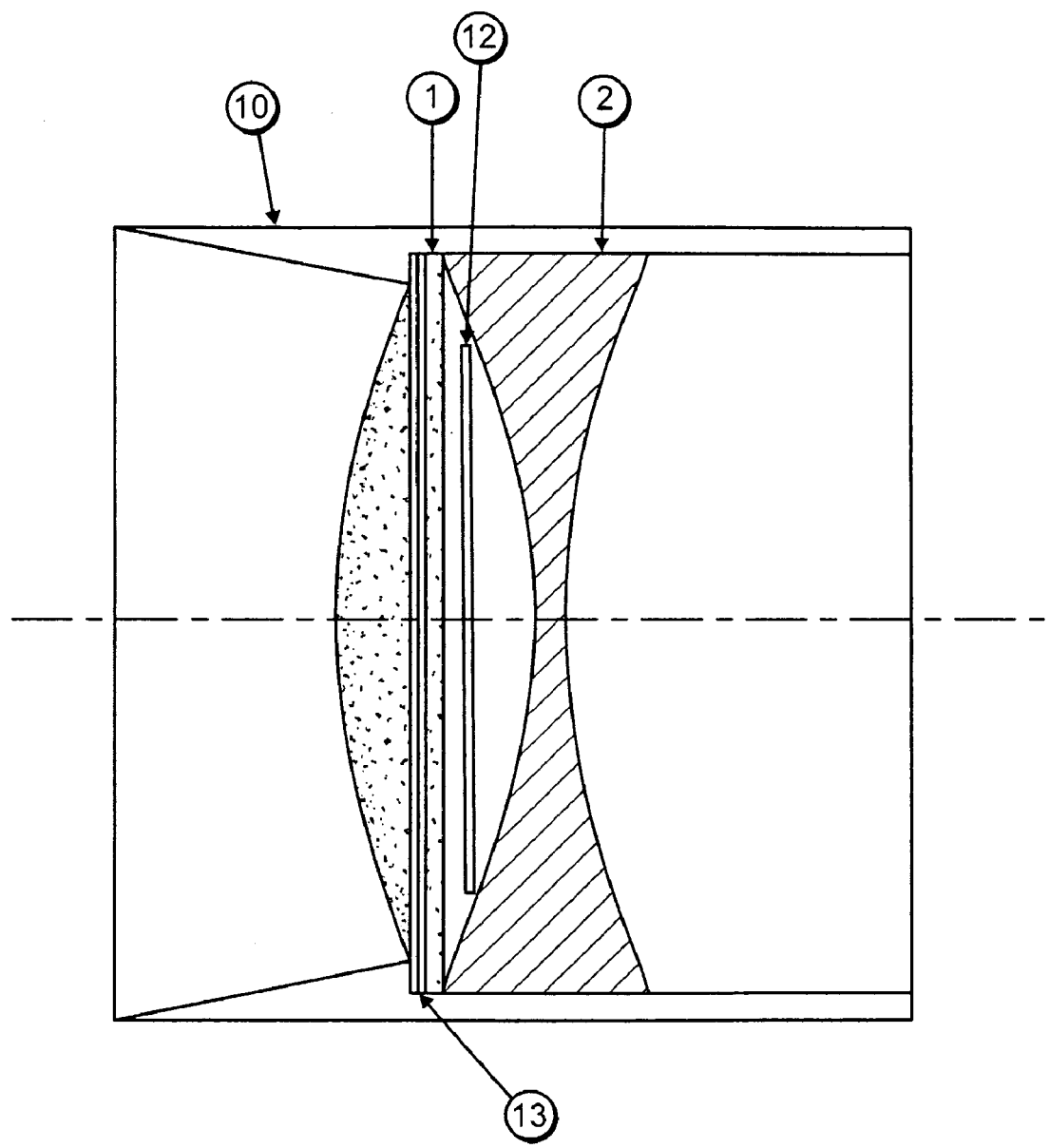
FIG. 10 is an illustration of another embodiment which has no containment disc shown in FIGS. 8 and 9. Here, the ocular lens 2 is pressure fitted into the housing 10. The neoprene-like seal 13 and the EPPZ 12 along with the objective lens 1 are also denoted.
Figure 11:
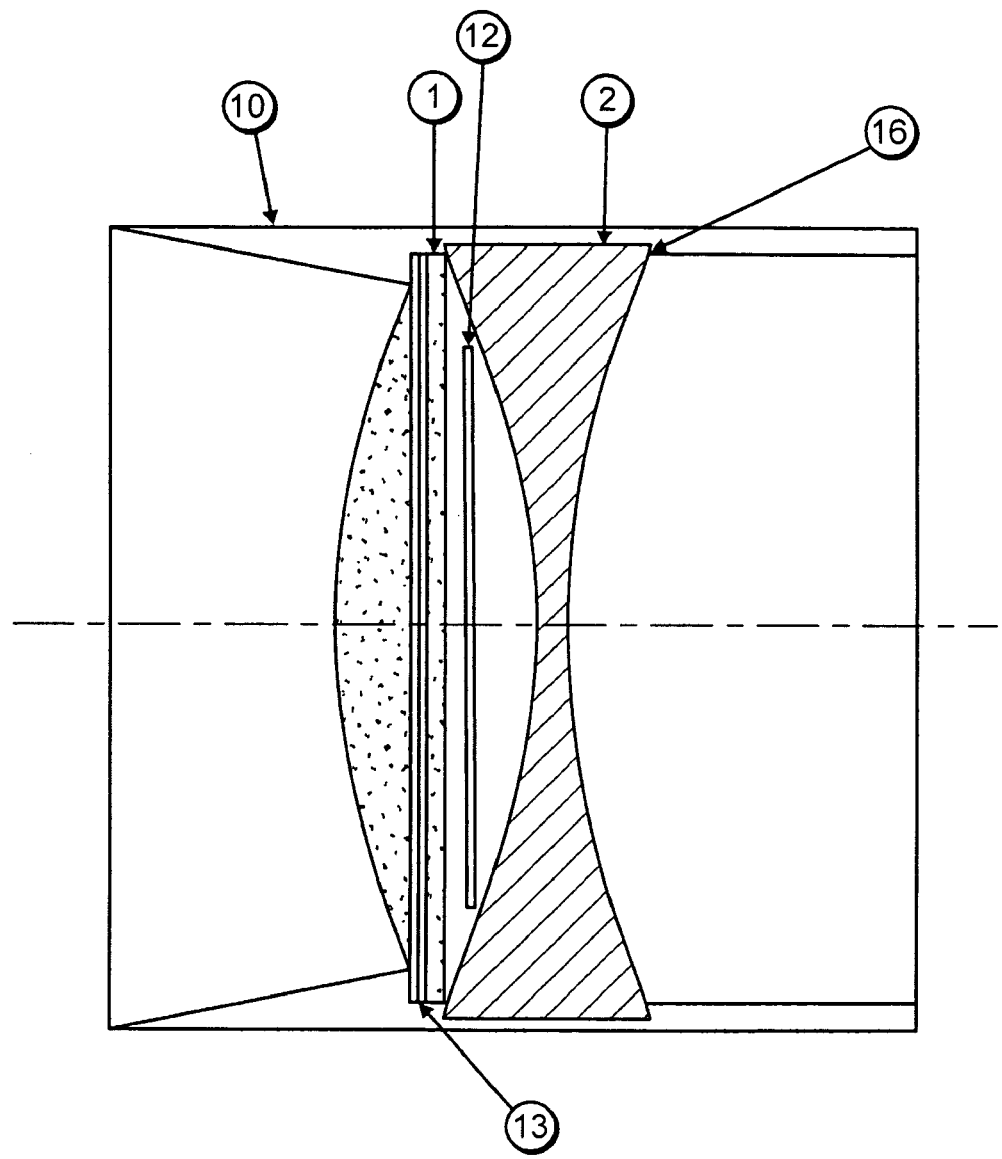
FIG. 11 illustrates yet another embodiment of the present invention. Again, the objective lens 1, the neoprene-like seal 13, the EPPZ 12, and the ocular lens 2 are denoted. In this depiction, the ocular lens at 2 is slot fitted into the housing 10. The slot structure is numbered at 16.
Figure 14:
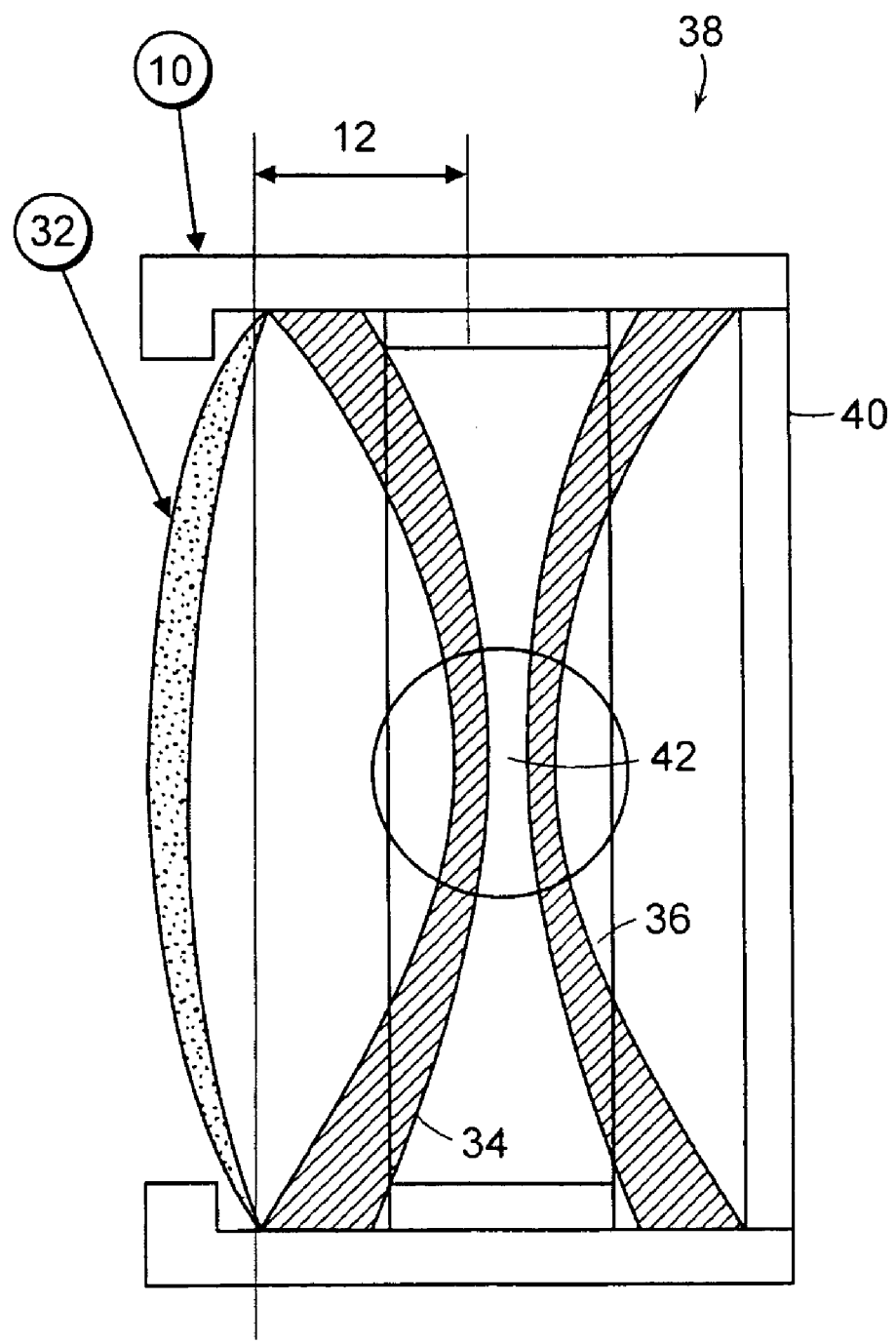
FIG. 14 illustrates an alternative embodiment of the invention utilizing lenses fabricated with contact lens technology. This unit is a modified Galilean scope comprised of three lenses. The lens number 32 is the objective. The lenses 34 and 36 are, together, the ocular element of this embodiment.

An example of a great-depth-of-field Galilean telescope is now described. One system is of the configuration as drawn in FIG. 8. The objective and ocular lens elements 1 and 2 would have long focal lengths. They contact each other at their peripheries. There may be a pressure fitted transparent disc located at number 11. The lenses and disc could be made of either plastic or glass. In a similar fashion a slot fitted disc as illustrated in FIG. 9 is also an optional model. Likewise, a version of the preferred embodiment of this invention with no disc leaving only the two basic lenses to define the model can easily be illustrated as those in FIGS. 10 and 11. FIG. 14 depicts a three lens modified Galilean type scope. The power of these units is approximately 1.03×.

The EPPZ at number 12 would be less than 0.1 millimeter in length, front to back, and slightly less than 18 millimeters in diameter. The front-to-back length along the optical axis of the EPPZ cylinder of the system as described in U.S. Pat. No. 5,189,560 and depicted in FIG. 3, 14 and FIG. 4, 15 can average approximately 3.5 mm in length.

In both long and compressed EPPZs, there are an infinite number of EPPs to correspond with the infinite number of object images being captured and brought to focus by the objective lens.

When the ocular lens of a very low power scope creates the infinite number of clear EPPs in an extremely short EPPZ, in combination with eye relief of approximately 4 to 500 millimeters, all of the exit pupil planes in this G.D.F. unit described in the present invention are simultaneously observable by virtually any scope user with or without emmotropic vision; taking into consideration normal vision irregularity correction either fabricated into the G.D.F. or added externally. Externally here, would be in line spectacle carrier lens corrections for the individuals "normal" vision corrective needs.

This simultaneous, clear image recognition at almost all distances forward of the present telescope requires little to no eye lens adjustment for almost all observers. The extreme, spectacle corrections of some scope users may require a prescription correction for total acquisition of all EPPs in the compressed EPPZ of FIGS. 5 and 7 at 4 and of FIGS. 8, 9, 10, 11, and 14 at 12.

The preferred Galilean systems described above are based on the conventional approach of a plano/convex (+) lens and a bi-concave (−) lens, which is the most efficient/impressive image producer for apparently internally located exit pupil imagery. However, with the low powers provided here, a Galilean lens design based on two convexo-concave lenses can be used to obtain the same GDF effect within limited vertex distances from eye lens to scope exit pupil. Such a system facilitates use of conventional contact lens manufacturing equipment.

The very short scope length that may be obtained with the present invention facilitates mounting on spectacles. In fact, the short scope may even be applied as a stick-on to the back surface of a conventional spectacle lens.

Figure 12B:
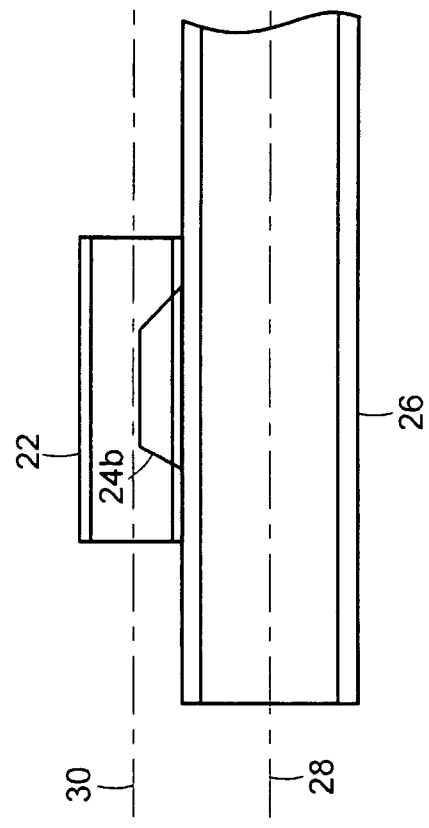
FIGS. 12 A and 12B illustrate alternative sight posts in a gunsight embodiment of the invention.
Figure 12A:
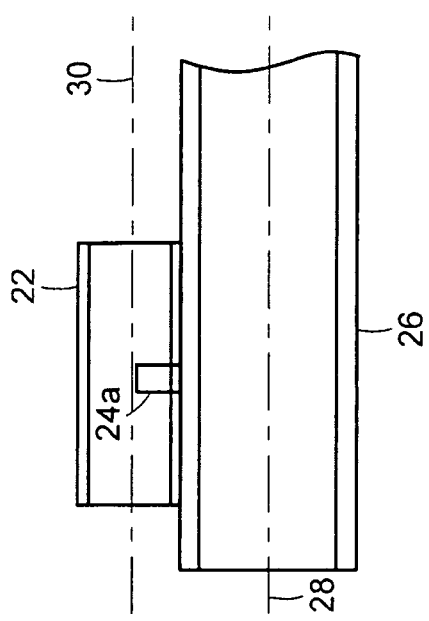

FIGS. 12A and 12B illustrate longitudinal sectional views of the post end of a small arm (hand gun, rifle, etc.). A tubular structure 16 is similar to the known rings used at the end of the barrel end aiming post. The tube is darkened (soot black inside and out). Its length can be 6.35 mm to 30 mm depending on the weapon being used. The diameter internally of this tube could range from 3 mm to 25.4 mm. This tubular structure may take the cross sectional shape of a circle, triangle, rectangle, etc. depending on the weapon and its use. The present referenced tube is displayed as a circular model. This tubing design prevents ambient light, under certain conditions, from being reflected from the end post site to the eye. This ambient light may cause the post 24a, 24b to appear as more than one image. The tube can be made from any durable material and either be attached before or after the barrel is made. The FIG. 12A and FIG. 12B post designs 24a, 24b are possible geometric representations for any sight posts. Number 22 is the cover tube, 26 is the weapons barrel and 28 is the barrel center bore. The center bores 30 of the cover tubes are parallel to the barrel bore and not skewed to the barrel bore.

Figure 13:
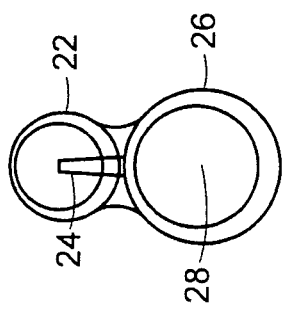
FIG. 13 illustrates an end view of the embodiments of FIGS. 12A and 12B.

FIG. 13 illustrates an end view of FIGS. 12A and 12B from the left side of the drawings.

In order to gain and maintain the best resolution of both the sight end post and target simultaneously, a barrel end post cover tube of a certain length and diameter can be used for several reasons:

1. The tubing around the post site when blacked to absorb ambient light, shields the post from light which could be reflected toward the eye.

2. The tube ring itself can be used to reticalize the system by concentrating the eye's focusing ability on the post and target in a manner similar to post rings.

3. Collimating the barrel bore with the cover tube end post site bore allows for greater accuracy while aiming the weapon.

4. If the sight post is marked with a dot which is iridescent within this dark-non-reflective cover tube area, the position or location of the target is greatly enhanced and defined in low external lighting conditions or when the target background is also dark.

5. In the example described above, any small arms weapon can be pre-collimated on a targeting range prior to field/combat use/deployment.

The length and diameter of the barrel end post cover tube 22 may have wide ranges depending on the type and use of the weapon being used. For example:

A. Hand guns may require tube lengths as high as 25.4 mm and diameter of 15.895 mm.

B. AR15 and M16 combat units may need only tubes of 12.7 mm length with 9.52 internal diameters. These dimensions could also apply to other types of rifles.

C. Shot guns, both pellet and slug, may require lengths up to 30 mm and internal diameters of 25.4 mm, only because these barrels may be long and the site post is further from the eye.

FIG. 14 displays a further adaptation of a Galilean scope comprising only lenses that can be fabricated using contact lens technology. In this case, there are three lenses involved for producing the apparent exit pupil plane zone 12. At 32 is the positive convexo-concave lens of the system. The lenses 34 and 36 are both negative lenses with concavo-convex and convexo-concave surfaces, respectively, from left to right in the drawing. Together, these negative lens serve as the single negative lenses of prior embodiments. Number 10 is the scope housing. Number 38 is a double negative lens spacer. At 40 is located a clear retainer disc. At the location 42, the two negative lenses may or may not touch at their optical centers.

This adaptation of the Galilean type scope of FIG. 14 splits what would normally be a single negative biconcave lens into a double negative lens combination. Each of these two negative lenses has approximately ½ of the focal length of a single negative for a standard Galilean plus/minus two lens structure. In FIG. 14, 38 is a spacer between the two lenses. These two negative lenses may or may not touch at their optical centers. Hence, the spacer surrounds a pocket of air between the two negative lenses.

Figure 15A:
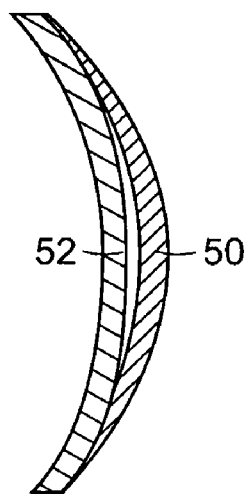
FIGS. 15A and 15B illustrate alternative embodiments of the invention in which modified Galilean scopes each comprise two lenses that may be fabricated using contact lens technology.
Figure 15B:
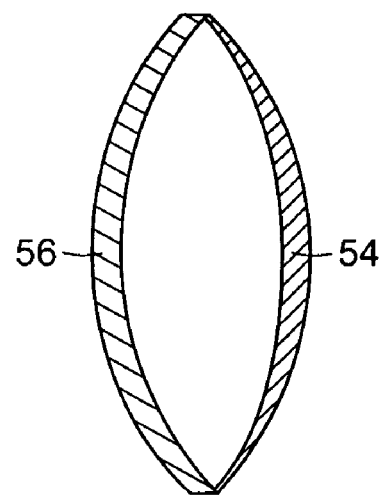

FIGS. 15A and 15B illustrate two adaptations of the Galilean scope, each comprising only two lenses that may be fabricated using contact lens technology. In FIG. 15A, lens 50 is the convexo-concave positive objective lens and, moving to the left, lens 52 is a convexo-concave negative ocular element. In FIG. 15B, lens 54 is the convexo-concave positive objective lens and, moving to the left, lens 56 is a concavo-convex negative ocular lens.

In each embodiment, the lenses may have antireflective, anti-scratch and/or tint coatings.

BIBLIOGRAPHY

Optics. W. H. A. Fincham, Seventh Edition, Hatton Press Ltd., Colombia House69, London, 1965.
Fundamentals of Optics. F. A. Jenkins, H. E. White, McGraw-Hill, Fourth Edition c 1957, 1976.
Geometrical Optics. Glenn A. Fry, Principles of Optometry Series, Volume 2, Chilton Book Co., Philadelphia c 1969.
The above references are incorporated herein by reference in their entireties.

While this invention has been particularly shown and described with references to preferred embodiments thereof, it will be understood by those skilled in the art that various changes in form and details may be made therein without departing from the scope of the invention encompassed by the appended claims.

What is claimed is:

1. A telescope of power less than 1.1 having lens components, each having a focal length of at least 70 mm, the lens components being positioned immediately adjacent to each other and fixed in position relative to each other.

2. A telescope as claimed in claim 1, wherein the lens components touch at their peripheries.

3. A telescope as claimed in claim 2 wherein the focal lengths are at least 1000 mm.

4. A telescope as claimed in claim 1 wherein the power is about 1.0.

5. A telescope as claimed in claim 4 wherein the focal lengths are greater than 1000 mm.

6. A telescope as claimed in claim 1 wherein the focal lengths are greater than 1000 mm.

7. A telescope as claimed in claim 1 having an exit pupil plane zone of less than 1 mm length.

8. A telescope as claimed in claim 1 having an exit pupil plane zone less than 0.01 mm in length.

9. A telescope as claimed in claim 1 of the Galilean type.

10. A telescope as claimed in claim 1 that provides simultaneous, clear viewing of objects from about 25 cm to far distances from a users eye.

11. A telescope as claimed in claim 1 with radii of curvatures greater than 70 mM.

12. A telescope as claimed in claim 11 with radii of curvatures less than 40,000 mM.

13. A telescope as claimed in claim 1 including reticles within an image of the telescope.

14. A telescope as claimed in claim 1 comprising:
a convexo-concave objective lens; and
an ocular element comprising a concavo-convex lens and a convexo-concave lens.

15. A telescope of power less than 1.1 having lens components, each having length of at least 1000 mm, the lens components being in fixed relative positions immediately adjacent to each other.

16. A telescope as claimed in claim 15, wherein the lens components touch at their peripheries.

17. A telescope as claimed in claim 15 wherein the power is about 1.0.

18. A telescope as claimed in claim 15 having an exit pupil plane zone of less than 1 mm length.

19. A telescope as claimed in claim 15 having an exit pupil plane zone less than 0.01 mm in length.

20. A telescope as claimed in claim 15 of the Galilean type.

21. A telescope as claimed in claim 15 that provides simultaneous, clear viewing of objects from about 25 cm to far distances from a users eye.

22. A telescope as claimed in claim 15 with radii of curvatures greater than 70 mM.

23. A telescope as claimed in claim 22 with radii of curvatures less than 40,000 mM.

24. A telescope as claimed in claim 15 including reticles within scope an image of the telescope.

25. A telescope as claimed in claim 15 comprising:
a convexo-concave objective lens; and
an ocular element comprising a concavo-convex lens and a convexo-concave lens.

* * * * *

UNITED STATES PATENT AND TRADEMARK OFFICE
CERTIFICATE OF CORRECTION

PATENT NO.         : 8,125,718 B2
APPLICATION NO.    : 12/378490
DATED              : February 28, 2012
INVENTOR(S)        : D. Brandon Edwards It is certified that error appears in the above-identified patent and that said Letters Patent is hereby corrected as shown below:

Column 16, Claim 24, Line 46, delete "scope".

Signed and Sealed this
First Day of May, 2012

David J. Kappos
*Director of the United States Patent and Trademark Office*